(12) United States Patent
Nakayama et al.

(10) Patent No.: US 10,585,842 B2
(45) Date of Patent: Mar. 10, 2020

(54) COMPUTER SYSTEM FOR VIRTUALIZING I/O DEVICE AND METHOD OF OPERATING THE SAME AND HUB DEVICE

(71) Applicant: AKIB SYSTEMS INC., Tokyo (JP)

(72) Inventors: Hideto Nakayama, Tokyo (JP); Kentaro Iwasawa, Tokyo (JP)

(73) Assignee: AKIB SYSTEMS INC., Tokyo (JP)

( * ) Notice: Subject to any disclaimer, the term of this patent is extended or adjusted under 35 U.S.C. 154(b) by 0 days.

(21) Appl. No.: 15/058,961

(22) Filed: Mar. 2, 2016

(65) Prior Publication Data

US 2016/0179745 A1 Jun. 23, 2016

Related U.S. Application Data

(63) Continuation of application No. PCT/JP2013/073637, filed on Sep. 3, 2013.

(51) Int. Cl.
*G06F 13/42* (2006.01)
*G06F 13/38* (2006.01)
(Continued)

(52) U.S. Cl.
CPC .......... *G06F 13/4282* (2013.01); *G06F 9/441* (2013.01); *G06F 9/45558* (2013.01);
(Continued)

(58) Field of Classification Search
CPC ....... G06F 13/4022; G06F 2009/45579; G06F 9/45558; G06F 9/455; G06F 13/4282;
(Continued)

(56) References Cited

U.S. PATENT DOCUMENTS 5,581,709 A * 12/1996 Ito .................. G06F 13/4022
710/38
7,937,447 B1 * 5/2011 Cohen .................. H04L 67/1097
709/212
(Continued)

FOREIGN PATENT DOCUMENTS

JP 2009-037610 A 2/2009
JP 2009-094778 A 4/2009
(Continued)

OTHER PUBLICATIONS

Oct. 1, 2013 International Search Report issued in International Patent Application No. PCT/JP2013/073637.
(Continued)

*Primary Examiner* — Faisal M Zaman
(74) *Attorney, Agent, or Firm* — Oliff PLC (57) ABSTRACT

Provided are a system and related devices whereby it is easy to achieve I/O virtualization. A HUB device according to the present invention is provided with a switch for internal slots in a PC (for example, internal PCI-Express slots) and is configured to be able to interconnect internal slots in other PCs. In a computer system in which one or more PCs are interconnected by this HUB device, which serves as the central point of connection, each PC can "see" I/O devices of other PCs through the switch for the internal slots. Therefore, each PC creates a device list including I/O devices of the PC and I/O devices of other PCs, and the OS of the PC uses the device list. As a result, it is possible to easily achieve I/O virtualization.

6 Claims, 7 Drawing Sheets

(51) Int. Cl.
*G06F 9/4401* (2018.01)
*G06F 9/455* (2018.01)
*G06F 13/40* (2006.01)

(52) U.S. Cl.
CPC ........ *G06F 13/385* (2013.01); *G06F 13/4022* (2013.01); *G06F 2009/45579* (2013.01)

(58) Field of Classification Search
CPC ......... G06F 2009/45595; G06F 9/5077; G06F 13/4221; G06F 2213/0026
USPC ................ 710/104, 301, 313, 316, 302, 306
See application file for complete search history.

(56) References Cited

U.S. PATENT DOCUMENTS

| | | | | |
|---|---|---|---|---|
| 8,180,949 | B1* | 5/2012 | Shah | H04L 67/1097 370/395.21 |
| 8,893,122 | B2* | 11/2014 | Kobayashi | G06F 11/1497 718/1 |
| 9,229,638 | B1* | 1/2016 | Bora | G06F 3/0653 |
| 2002/0002609 | A1* | 1/2002 | Chung | G06F 9/5061 709/223 |
| 2006/0253619 | A1* | 11/2006 | Torudbakken | G06F 13/4022 710/31 |
| 2007/0226329 | A1* | 9/2007 | Moribe | H04L 12/66 709/223 |
| 2009/0150463 | A1* | 6/2009 | Sekiguchi | G06F 9/44505 |
| 2010/0036995 | A1* | 2/2010 | Nakayama | G06F 13/4022 710/316 |
| 2010/0161912 | A1* | 6/2010 | Daniel | H04L 67/1097 711/147 |
| 2010/0257302 | A1* | 10/2010 | Suzuki | G06F 13/4027 710/314 |
| 2010/0312943 | A1* | 12/2010 | Uehara | G06F 13/387 710/316 |
| 2011/0055433 | A1* | 3/2011 | Kishore | G06F 13/4022 710/9 |
| 2011/0113166 | A1* | 5/2011 | Hung | G06F 13/4027 710/63 |
| 2012/0005392 | A1* | 1/2012 | Yagi | G06F 13/409 710/313 |
| 2012/0131153 | A1* | 5/2012 | Schmidt | H04L 61/103 709/220 |
| 2013/0254453 | A1* | 9/2013 | Sato | G06F 13/4022 710/317 |
| 2014/0006679 | A1* | 1/2014 | Eguchi | G06F 13/36 710/316 |
| 2014/0032810 | A1* | 1/2014 | Kanigicherla | G06F 9/4843 710/314 |
| 2014/0173157 | A1* | 6/2014 | Shaw | G06F 13/385 710/305 |
| 2014/0215458 | A1* | 7/2014 | Devarapalli | G06F 9/455 718/1 |
| 2014/0269754 | A1* | 9/2014 | Eguchi | G06F 13/4022 370/419 |
| 2014/0281072 | A1* | 9/2014 | Yang | G06F 13/4295 710/106 |
| 2015/0067229 | A1* | 3/2015 | Connor | G06F 13/4022 710/317 |

FOREIGN PATENT DOCUMENTS

| | | |
|---|---|---|
| JP | 2009-151767 A | 7/2009 |
| JP | 4-322348 B2 | 8/2009 |
| JP | 2010-176212 A | 8/2010 |
| JP | 2011-164044 A | 8/2011 |
| JP | 5069079 B2 | 11/2012 |
| JP | 2013-003691 A | 1/2013 |

OTHER PUBLICATIONS

Mar. 8, 2016 International Preliminary Report on Patentability issued in International Patent Application No. PCT/JP2013/073637.

* cited by examiner

COMPUTER SYSTEM FOR VIRTUALIZING I/O DEVICE AND METHOD OF OPERATING THE SAME AND HUB DEVICE

TECHNICAL FIELD

The present invention relates to a technology for virtualizing an I/O device (input/output device) of a computer.

BACKGROUND ART

Today, in widely used server systems, virtualization is widely performed. In other words, so-called virtualization of the server is performed. By virtualizing the server, it is possible to enhance the efficiency of utilization of physical resources on the server side.

However, enhancing the efficiency of utilization on the server side (CPU side) results in burden on an I/O (input/output device) side being disadvantageously increased to cause further complication.

For example, due to a request from a user, it may be necessary to connect an arbitrary virtual server to an arbitrary network. In this case, in tell is of security, an individual physical I/O is often provided, and this causes an increase in the number of I/Os.

For example, it is necessary to perform the sharing of storage in order to store a virtual server. Consequently, however, it is also necessary to provide an EtherNet (registered trademark) and a fiber channel and the like according to the request of the user, and further necessary to increase the number of various physical I/Os, with the result that the system is likely to be complicated.

For example, in order to manage a virtual environment, it may be necessary to provide a dedicated I/O.

For example, the efficiency of utilization of the server is enhanced by the virtualization of the server, and thus a band consumed by the I/O is increased, with the result that the bandwidth of an I/O bus may be a bottleneck in today's computer systems.

Improved Conventional Technologies

In order to solve the problems of the I/O described above, various technologies have been developed.

As a first improved conventional technology, there is a technology relating to the sharing/virtualization of storage. This technology is intended to enhance the operating rate of storage by the sharing/virtualization of storage.

Examples of such technology include patent literature 1, which will be described later, and the like.

A second improved conventional technology is a method (such as patent literatures 2 and 3) of sharing an I/O adapter from a plurality of computers and a method (patent literature 4) of performing DMA using a virtual address.

As a third improved conventional technology, virtualization and the like of a network are known.

However, the efficiency of storage and USBs and the like are only partially enhanced with these methods, with the result that it may be difficult to solve the problem of the entire I/O.

CITATION

Patent literature 1 below discloses a technology for sharing storage by dividing the storage with a virtualization function.

Patent literature 2 below discloses a technology for virtualizing a USB adapter.

Patent literature 3 below discloses a technology for sharing one input/output adapter by a plurality of logical partitions.

Patent literature 4 below discloses an I/O-HUB which receives a DMA. The HUB has the function of determining whether or not a virtual address of a requested DMA is converted into a physical address.

CITATION LIST

Patent Literature

Patent Literature 1: Japanese Unexamined Patent Application Publication No. 2013-003691
Patent Literature 2: Japanese Unexamined Patent Application Publication No. 2011-146044
Patent Literature 3: Japanese Unexamined Patent Application Publication No. 2009-151767
Patent Literature 4: Japanese Unexamined Patent Application Publication No. 2009-037610

SUMMARY OF INVENTION

Technical Problem

Due to the circumstances described above, in order to fundamentally solve the problem of the I/O, the inventor of the present application has considered that it is preferable to realize "virtualization of the I/O". The invention of the present application has been made based on such circumstances, and an object thereof is to provide a device and a method for easily realizing "virtualization of the I/O".

Solution to Problem

On the other hand, the inventor of the present application has developed a network using a PCI-Express and has separately filed a patent application for this invention. In the network using the PCI-Express, a HUB device for the PCI-Express is also developed and a plurality of PCs can form the network through the HUB. With respect to the HUB device, a patent registration has already been received (Japanese Patent No. 5069079).

In the network of the PCI-Express through the HUB as described above, a network protocol is passed on the PCI-Express to realize the network. Hence, since the PCI-Express internal slot (expansion slot) of a PC on one side can be seen from the PC on the other side as it is through the PCI-Express, the inventor of the present application has considered that virtualization of the I/O is easily performed.

As will be described in an embodiment to be discussed later, a HUB device is a device which basically utilizes the interface of an internal slot in a PC to perform network connection. However, it is particularly preferable to only utilize the HUB device for the virtualization of the I/O without performing network connection (for example, EtherNet (registered trademark)).

In this case, it may be appropriate to refer to the "HUB device" as an "I/O virtualization box", an "I/O virtualizing device", or the like.

Specifically, the invention of the present application adopts the following configurations.

(1) The present invention is made in view of the foregoing problem. There is provided a computer system including: a HUB device which includes a plurality of ports; and at least one or more computers which are connected to the ports, where in a computer system in which virtualization of an I/O can be performed, the computer includes a dedicated NIC device which is connected to an internal slot within the computer and which connects the internal slot and the ports together, the HUB device includes switch means which switches the same signal as a signal of the internal slot and the switch means inputs and outputs the same signal as the signal of the internal slot through the ports.

(2) In the computer system of the above (1) according to the present invention, the internal slot is a PCI-Express.

(3) In the computer system of the above (1) according to the present invention, the computer includes storage means which retains information on an I/O device included in a computer other than its own computer, and the computer can access through the HUB device, by utilizing the information on the I/O device, the I/O device included in the computer other than its own computer.

(4) In the computer system of the above (3) according to the present invention, the information on the I/O device includes at least address information of the I/O device included in the computer other than its own computer.

(5) In the computer system of the above (1) according to the present invention, the dedicated NIC device includes: a first internal slot connector; a second internal slot connector; and a switch means which connects the first internal slot connector and the second internal slot connector together, and the switch means outputs a signal input from the first internal slot to the second internal slot, and outputs a signal input from the second internal slot to the first internal slot.

(6) In the computer system of the above (5) according to the present invention, a transmission FIFO which stores data on the signal when the signal input from the first internal slot is output to the second internal slot, and a reception FIFO which stores the signal when the signal input from the second internal slot is output to the first internal slot are connected to the switch means.

(7) In the computer system of the above (1) according to the present invention, the internal slot is a PCI-Express, and the switch means takes out a predetermined address from a TLP input from any one of the ports, determines a destination based on the predetermined address and feeds out the input TLP to the port of the destination.

(8) A method of operating the computer system of the above (1) according to the present invention includes: a first step of starting up a BIOS of one or more computers to produce a first device list; a second step of starting up a BIOS of the HUB device to produce a second device list; a third step of coupling the first device list and the second device list to produce a third device list; and a third step of utilizing the third device list by an OS.

(9) In the method of operating the computer system of the above (1) according to the present invention, the internal slot is a PCI-Express, and the switch means in the HUB device takes out a predetermined address from a TLP, determines a destination based on the predetermined address and feeds out the input TLP to the port of the destination.

(10) In the computer system of the above (3) or (4) according to the present invention, the information on the I/O device is a device list produced by a BIOS.

(11) In order to solve the foregoing problem, according to the present invention, the dedicated NIC device used in the computer system of the above (1) is provided, where the dedicated NIC device includes switch means which switches the same signal as the signal of the internal slot and the switch means inputs and outputs the same signal as the signal of the internal slot through the ports.

(12) The dedicated NIC device of the above (11) according to the present invention includes: a first internal slot connector; a second internal slot connector; and switch means which connects the first internal slot connector and the second internal slot connector together, where the switch means outputs a signal input from the first internal slot to the second internal slot, and outputs a signal input from the second internal slot to the first internal slot.

(13) In the dedicated NIC device of the above (12) according to the present invention, a transmission FIFO which stores data on the signal when the signal input from the first internal slot is output to the second internal slot, and a reception FIFO which stores the signal when the signal input from the second internal slot is output to the first internal slot are connected to the switch means.

(14) In the HUB device used in the computer system of the above (1) according to the present invention, the internal slot is a PCI-Express, and the switch means takes out a predetermined address from a TLP input from any one of the ports, determines a destination based on the predetermined address and feeds out the input TLP to the port of the destination.

Advantageous Effects of Invention

As described above, according to the present invention, since a HUB device which includes the switch means and which can be connected to another PC through this switch is used, it is possible to establish information on the I/O devices including the I/O device provided in the other PC. Typically, it is possible to establish the device list having the details described above. It is therefore possible to treat the I/O device of the other PC as if it were the I/O device included in one's own PC, making it possible to realize so-called virtualization of the I/O.

Since the information on the I/O device is provided to another computer, even in the other computer, it is possible to recognize the I/O device included in the other PC as if it were the I/O device included in one's own computer, with the result that it is possible to realize virtualization of I/O devices between two or more computers connected to each other.

BRIEF DESCRIPTION OF EMBODIMENTS

DESCRIPTION OF EMBODIMENTS

A preferred embodiment of the present invention will be described below with reference to the drawings.

In the present embodiment, a description will be given of the fact that in a system which forms a network by the utilization of the internal slot interface of a PC, it is possible to easily realize the virtualization of an I/O by the utilization of this mechanism.

In the first to third sections of the following description, a method of using a PCI-Express to form a network will be described, and in the fourth section, a HUB device used in this method/mechanism will be described.

Then, in the fifth section, the configuration of a computer using the PCI-Express will be described.

Then, in the sixth section, a structure when the HUB device is used to form the network will be described. In the seventh section, an operation method in which the virtualization of the I/O can be realized by this structure will be described. The eighth section is a conclusion.

Table of Contents

First section: TLP of the PCI-Express
Second section: Ethernet frame
Third section: Method of placing Ethernet frame on PCI-Express
Fourth section: Configuration of HUB
Fifth section: Configuration of computer using PCI-Express
Sixth section: Structure when HUB device is used to form network
Seventh section: Realization of virtualization of I/O
Eighth section: Conclusion/variations First Section: TLP of the PCI-Express Transmission Side In the PCI-Express, on a transmission side, according to a request from a software layer, a TLP (Transaction Layer Packet) is generated in a transaction layer.

Figure 1:
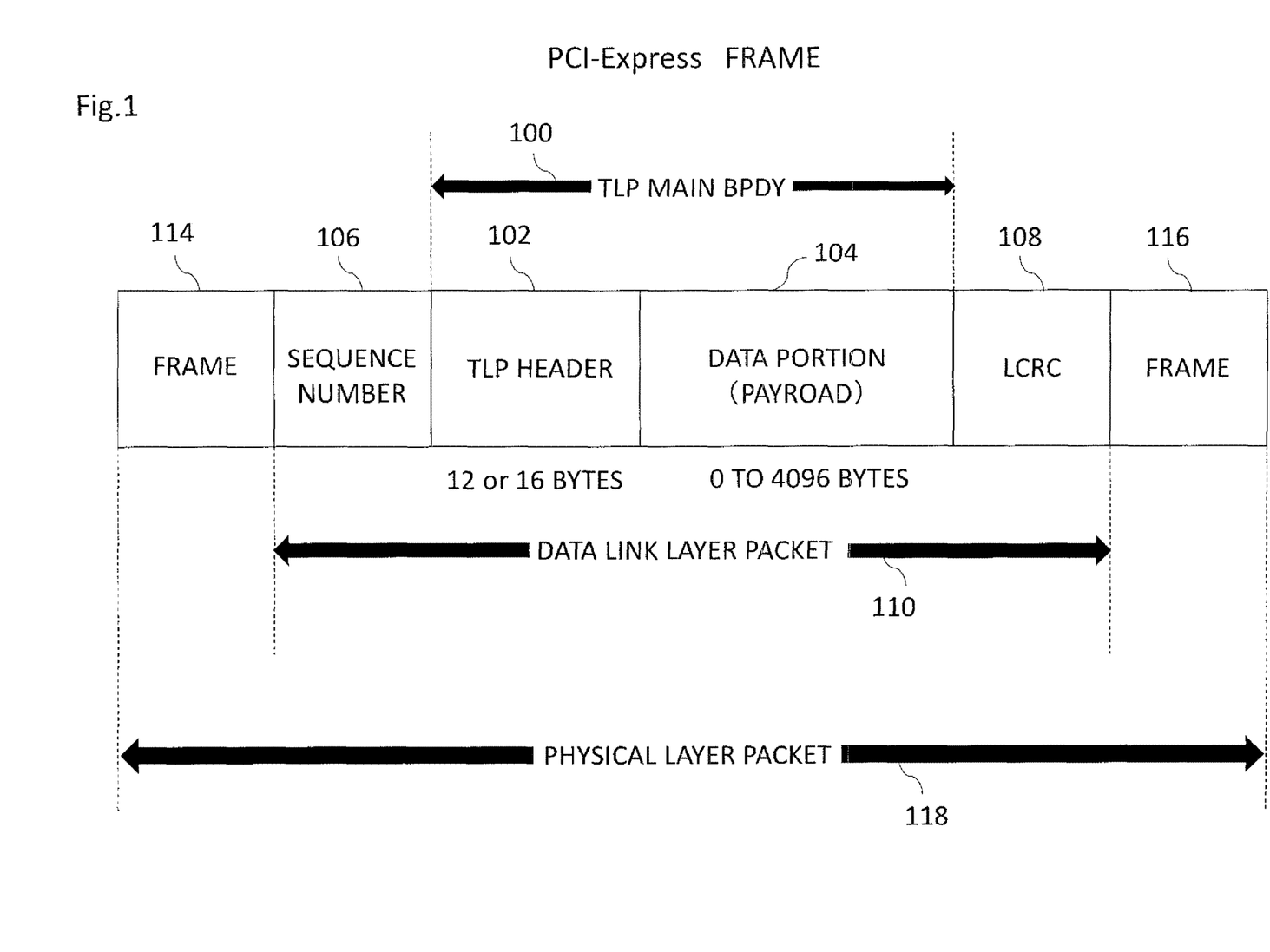
FIG. 1 is an illustrative diagram showing an outline of the format of a TLP.

An outline of the format of the Transaction Layer Packet (TLP) is shown in FIG. 1. As shown in FIG. 1, a TLP main body 100 is formed with a TLP header 102 and a data portion 104. Although an ECRC or the like may be added, it is omitted in the present specification. The TLP header 102 may be simply referred to as the header 102.

The data portion 104 is often referred to as a "payload". In the data portion, in general, 256 k bytes are widely used. Although the data portion can be expanded up to 4 k bytes (4096 bytes) in terms of standards, almost no device which supports this is known. In general, the data portion is often 256 bytes.

On the transmission side, the TLP main body 100 in the transaction layer is passed to a data link layer. In the data link layer, a sequence number 106 and an LCRC 108 are added. In this way, a data link layer packet 110 is formed (see FIG. 1). The data link layer packet 110 is passed from the data link layer to a physical layer.

Furthermore, in the physical layer, a start frame 114 and an end frame 116 are added to the data link layer packet 110 to form a physical layer packet 108.

Reception Side

On the reception side, in the physical layer, the data link layer packet 110 excluding the start frame 114 and the end frame 116 is generated and is fed to the data link layer. The data link layer which receives the data (the data link layer packet 110) fed from the physical layer checks the sequence number 106 and the LCRC 108 and passes the TLP main body 100 excluding these to the transaction layer.

The transaction layer on the reception side analyzes the data (the TLP main body 100) received from the data link layer, extracts data according to a command type and passes it to the software layer.

Command types, addresses and the like are stored within the TLP header 102.

Second Section: Ethernet Frame

Figure 2:
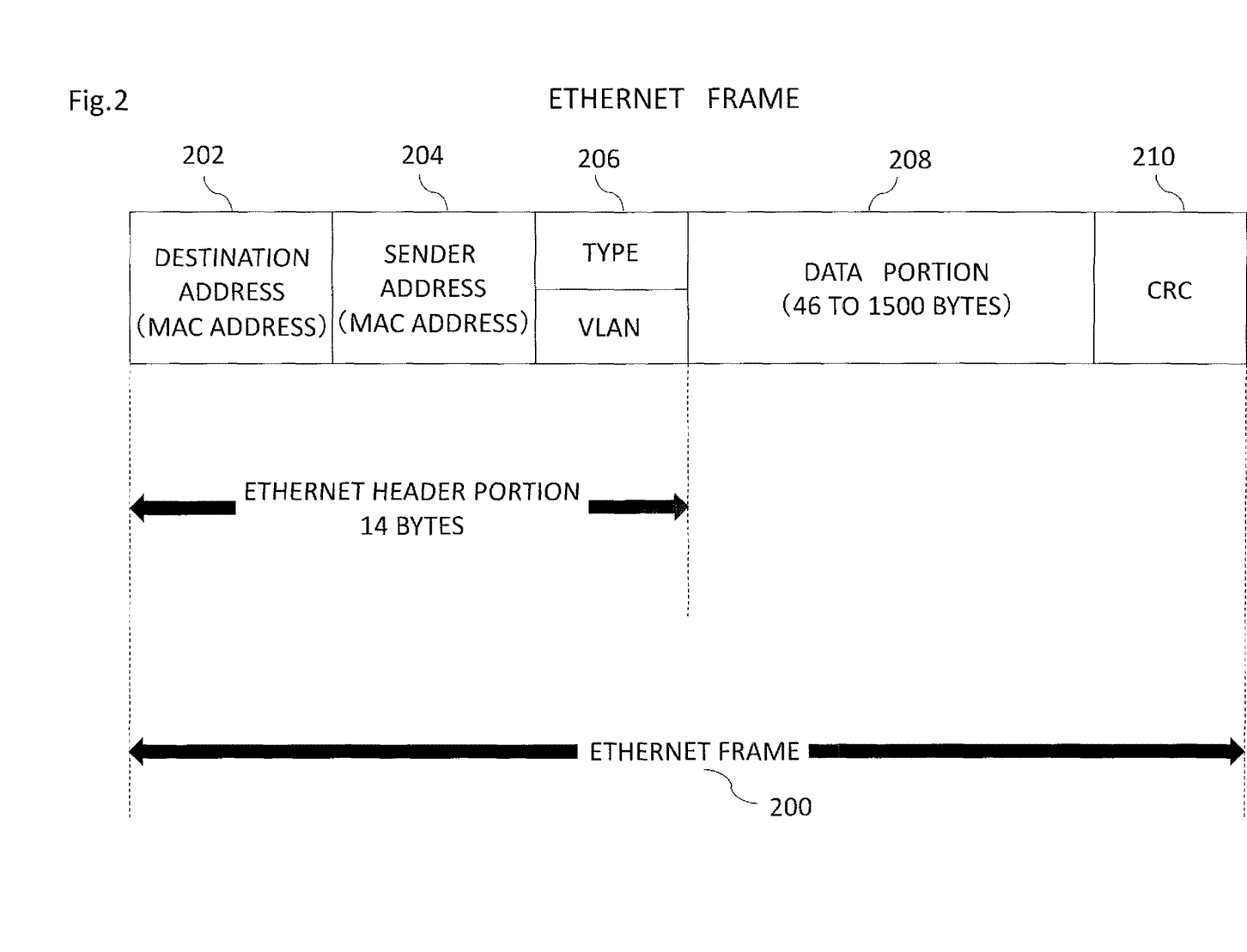
FIG. 2 is an illustrative diagram showing an outline of an Ethernet frame.

FIG. 2 is an illustrative diagram showing an outline of an example of an Ethernet frame 200. In an example shown in this figure, in an EtherNet (registered trademark), a destination address 202 and a sender address 204 are included, and these are so-called MAC addresses (a MAC address is a physical address of 48 bits specific to a device). These addresses are combined with a type 206 to form an Ethernet header portion (14 bits). The field of the type 206 is often used as a VLAN.

The Ethernet frame 200 is further formed with a data portion (46 to 1500 bytes) 208 and a CRC 210. However, in recent years, a large frame up to about 8000 bytes has often been used as the Ethernet frame 200, depending on the type of configuration.

Third Section: Placing Ethernet Frame on PCI-Express

As a feature of the present embodiment, in the data portion 104 of the PCI-Express shown in FIG. 1, the Ethernet frame shown in FIG. 2 is stored. In this feature, on the PCI-Express, the communication of the EtherNet (registered trademark) can be performed.

Furthermore, as one of the features of the present embodiment, the frame of the EtherNet (registered trademark) is divided when it is large, and these divisions are stored in a plurality of PCI-Expresses. In this way, even a large-sized frame of the EtherNet (registered trademark) such as a jumbo frame can be stored in the PCI-Express frame.

Fourth Section: Configuration of HUB Device

As described above, the inventor of the present application has developed the network using PCI-Express. A HUB device for the PCI-Express is used in this network using PCI-Express, and patent registration for this HUB device has already been received (Japanese Patent No. 5069079).

The same HUB device is also utilized in the present embodiment. A block diagram of the configuration of a HUB device 300 is shown in FIG. 3.

Figure 3:
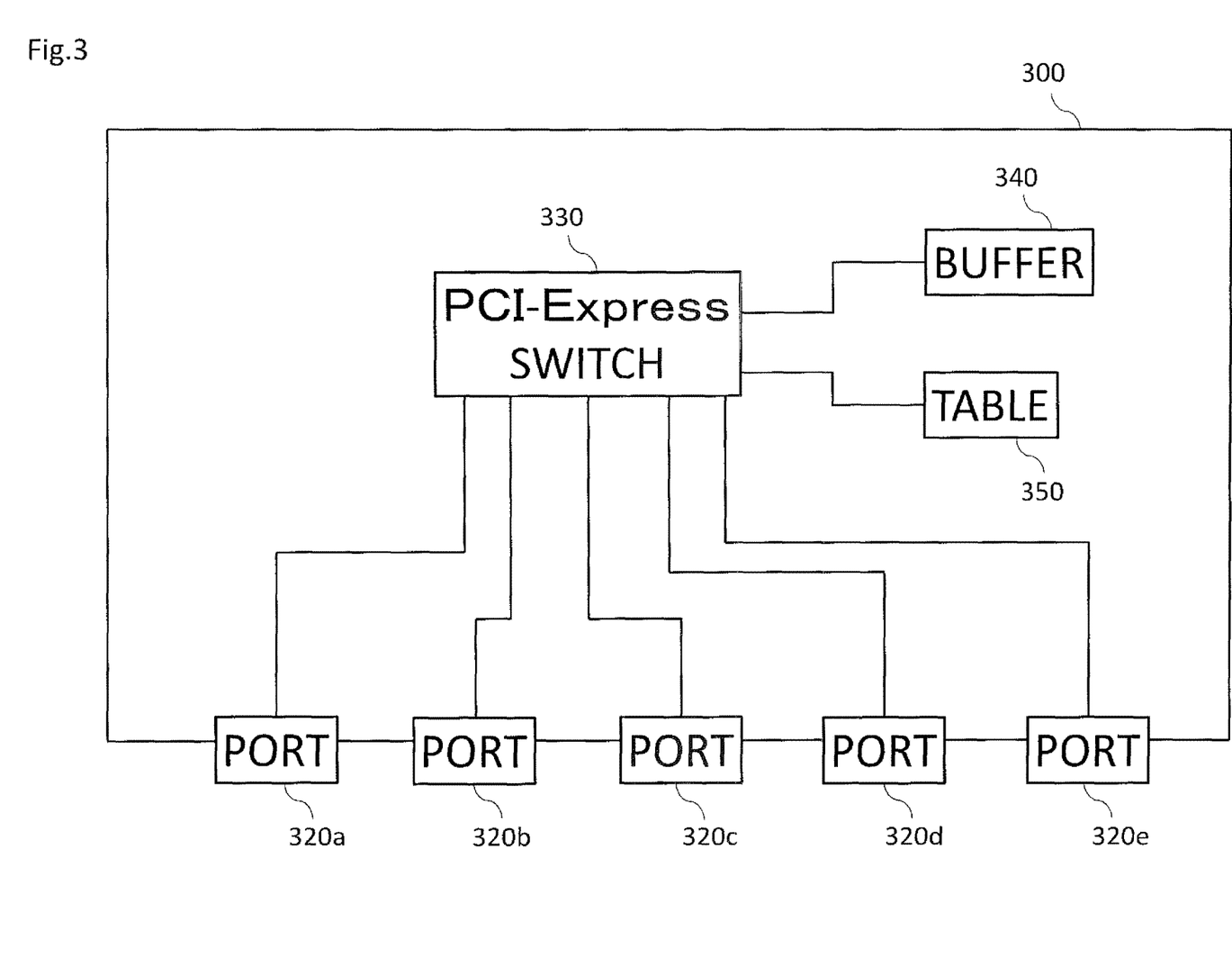
FIG. 3 is a block diagram of the configuration of a HUB device.

As shown in FIG. 3, the HUB device 300 includes five ports 320*a*, 320*b*, 320*c*, 320*d* and 320*e*. These ports 320*a* to 320*e* are the ports of the PCI-Express.

Although described in Japanese Patent No. 5069079, the ports 320*a* to 320*e* of the PCI-Express can be utilized as the ports of the network. In short, the HUB device 300 of FIG. 3 performs switching between these ports 320*a* to 320*e* to realize fast communication between the ports 320.

Various operations of the HUB device 300 can be set in advance by connecting a host computer to the HUB device 300. This host computer refers to a computer that includes application software for managing the operations of the HUB device 300.

*Method of Describing Ports and Others

A PCI-Express is known as the internal bus of a computer. Depending on the computer, one or a plurality of connection ports of the internal bus may be provided within the computer. The connection port may be generally referred to as an "internal slot". In the case of the PCI-Express, when the signal of the internal slot is drawn to the outside, this may be particularly referred to as a "port".

The "port" of the present embodiment is the same as the internal slot of the PCI-Express in terms of signals and, here, each connection port in a "switch" is referred to as a "port".

Fifth Section: General Configuration of Computer using PCI-Express

Figure 4:
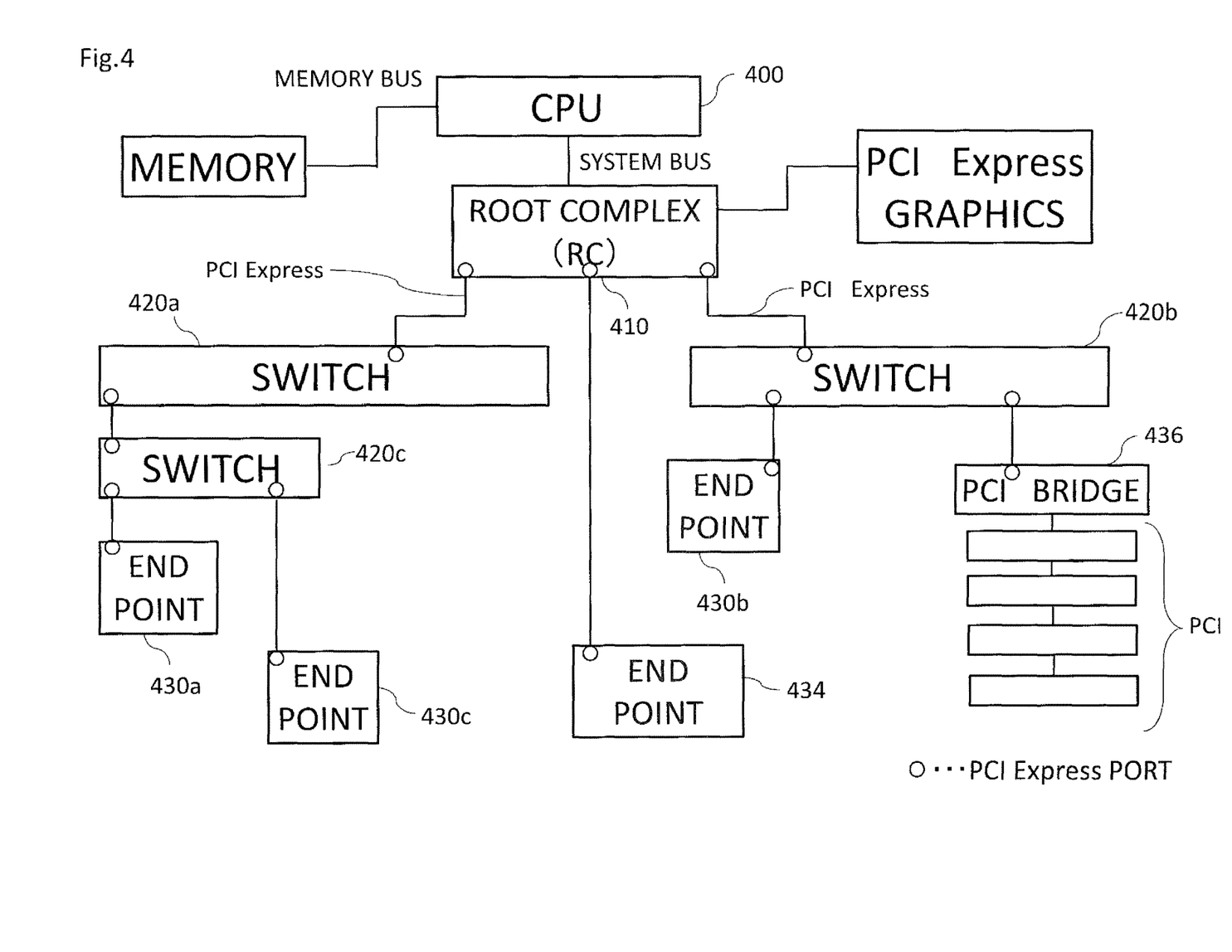
FIG. 4 is an illustrative diagram showing an example of a general configuration using a PCI-Express.

An example of the general configuration of a computer including the internal ports (which are also referred to as "internal slots", "internal buses" or the like and which may be also referred to as "expansion slots" or "expansion buses" in terms of meanings) of the PCI-Express is shown in FIG. 4. The PCI-Express is one of the standards of internal buses. In the present embodiment, a description will be given based on a case where the PCI-Express is used as the internal bus.

When the PCI-Express is used, a root complex (hereinafter simply also referred to as an RC) 410 is first connected to a CPU 400. Although a plurality of PCI-Express ports are provided in the RC 410, switches 420a, 420b and 420c may be further provided such that a necessary number of ports are provided. These switches 420 may be connected in multiple stages in terms of the necessary number of ports (see FIG. 4).

The I/O device is referred to as an end point and is connected to the switch 420a, the switch 420b and the like. Various end points are present. Examples thereof include normal PCI-Express end points 430a, 430b and 430c which are connected to the PCI-Express ports of the switches 420 as they are and a root complex end point 434 which is connected to RC 410.

In FIG. 4, circles represent PCI-Express ports.

In the PCI-Express port, a so-called bridge which performs protocol conversion with another bus can be provided. In the example of FIG. 4, a PCI bridge 436 which performs protocol conversion with a PCI bus, which is a conventional bus, is shown. With this bridge, it is possible to perform conversion from the PCI-Express to the PCI bus.

FIG. 4 mainly shows the PCI-Express, and not only the memory (see FIG. 4), but also a storage means such as a hard disk is actually provided. Although not shown in the figure, a display device is connected to a PCI-Express graphics (see FIG. 4), and is connected to a system bus (see FIG. 4) through a predetermined interface such as a mouse or a keyboard (not shown in the figure).

Sixth Section: Structure when HUB Device is used to Form Network

Figure 5:
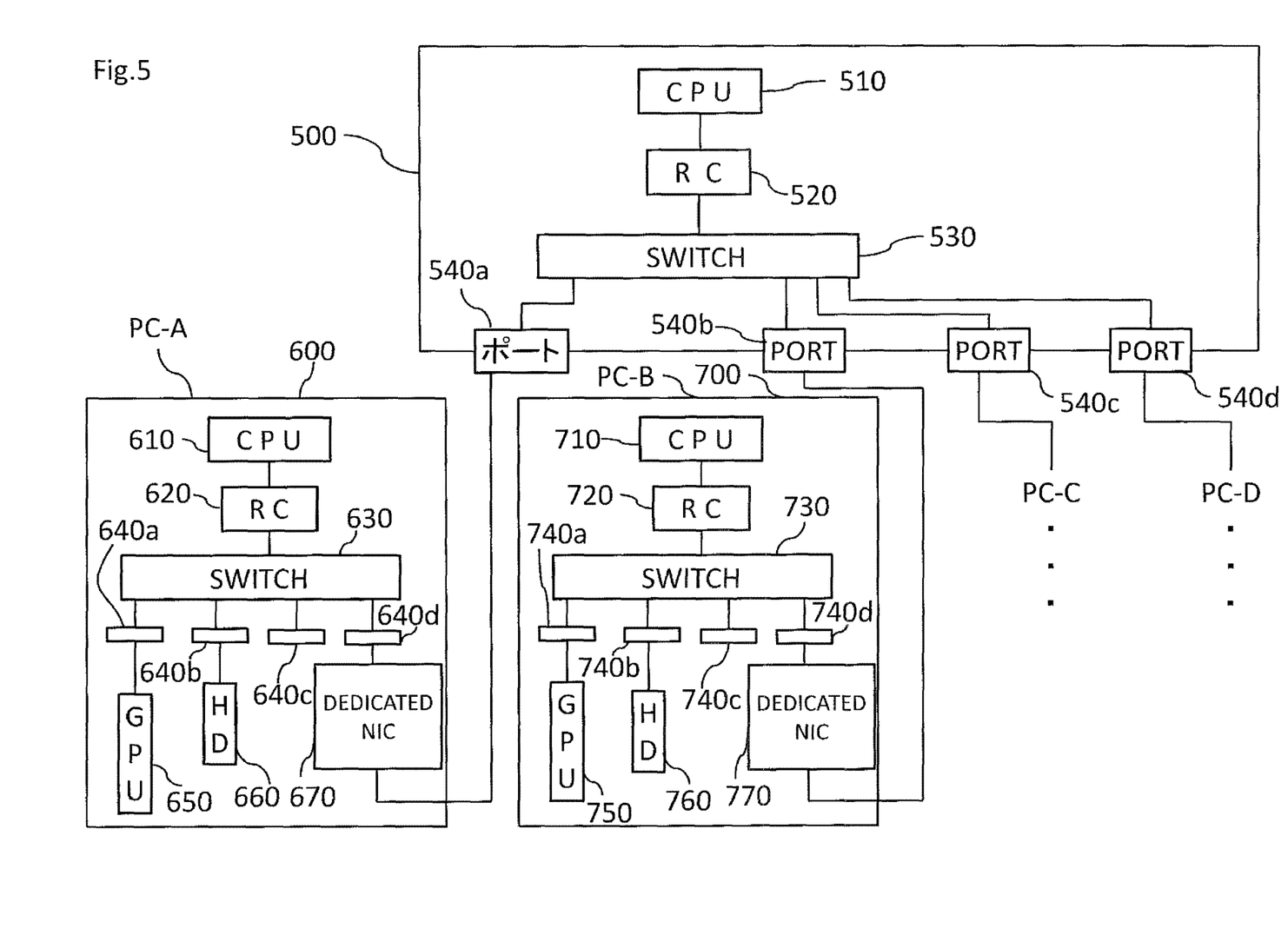
FIG. 5 is a diagram of a configuration when a computer using the PCI-Express is connected.

An example of a configuration when the HUB device 300 is actually used to connect a computer to a computer is shown in FIG. 5.

In FIG. 5, an example is shown where a HUB device 500 within which a switch is provided as in the HUB device 300 is used. The HUB device 300 and the HUB device 500 are the same devices substantially and functionally, though formal differences such as a difference in the number of ports (four ports, five ports) are present.

The HUB device 500 shown in FIG. 5 includes a CPU 510, an RC (root complex) 520 and a switch (PCI-Express switch) 530. In the switch 530, four ports 540a, 540b, 540c and 540d are provided, and four PCs (personal computers, often referred to as "PCs" in the present specification) can be connected thereto. FIG. 5 shows an example where four PCs (PC-A, PC-B, PC-C and PC-D) are connected.

The switch 530 is the switch of the PCI-Express which is an internal slot (internal bus), and corresponds to a preferred example of a switch means in the scope of the claims.

The switch means determines, based on a predetermined control rule, a destination (its PC) to which a signal of the PCI-Express input from a certain port 540 is fed, and feeds it to any one of the ports 540 which is the destination. For example, as described above, it is preferable that when the Ethernet frame or the like is inserted into the PCI-Express and they are used, various addresses (such as a MAC address) in the Ethernet frame are taken out, and the destination is determined based on the address which is taken out.

It is also preferable to store such a control rule in a table 350 or the like, and also preferable to store and set such a control rule within the switch 530.

FIG. 5 shows an example where a PC-A600 is connected to the port 540a and a PC-A700 is connected to the port 540b. Although a PC-C and a PC-D are also connected, the illustration thereof is omitted since they are connected in the same way as the PC-A600 and the PC-B700.

With the configuration and connection described above, a patent application has already been filed for technology for forming a network such as with the PC-A600 and the PC-B700, and a patent right has been acquired.

The PC-A600 includes a CPU 610 and an RC (root complex) 620 connected thereto. In the RC 620, a switch (PCI-Express switch) 630 is provided, and in the switch 630, ports 640a, 640b, 640c and 640d are provided.

A GPU 650 which is one type of I/O is connected to the port 640a. A HD 660 which is one type of I/O is connected to the port 640d. In the port 640d, a dedicated NIC device 670 is provided. The dedicated NIC is the same device as the dedicated NIC device described in Japanese Unexamined Patent Application Publication No. 2007-263197, includes a buffer for storing data and a means for transmitting data with predetermined timing, and can relay the signal of the PCI-Express.

As shown in FIG. 5, a system which is formed mainly with the HUB device 500 and with one or a plurality of PCs (personal computers) connected thereto is illustrated, and this system corresponds to a preferred example of a "computer system" in the scope of the claims. The PC-A600, the PC-B700 and the like which are the individual PCs of FIG. 5 correspond to a preferred example of a "computer" in the scope of the claims.

Sixth Section-1: Dedicated NIC Device

Figure 6:
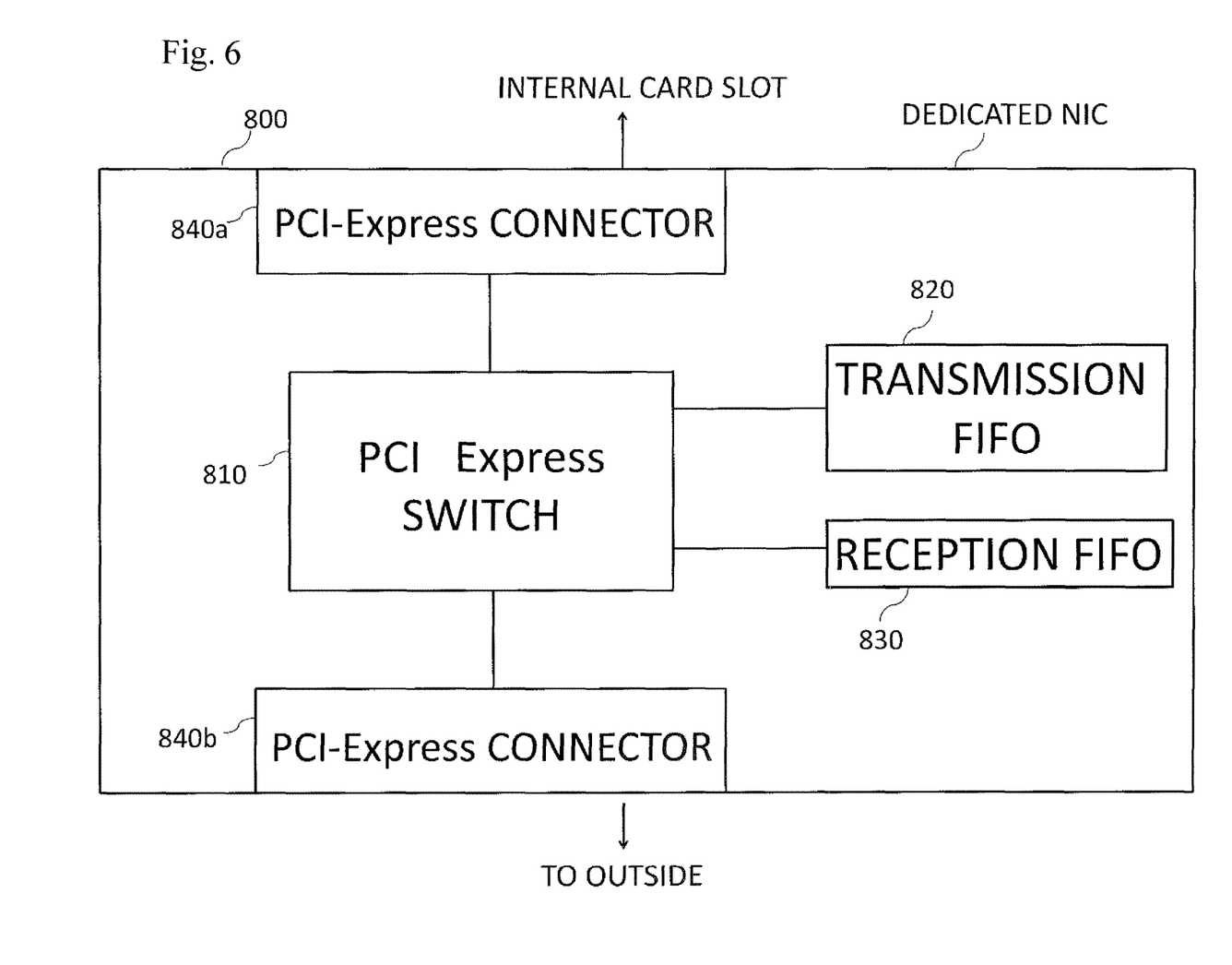
FIG. 6 is a block diagram of the configuration of a dedicated NIC device.

A block diagram of the configuration of a dedicated NIC device 800 is shown in FIG. 6. Although the dedicated NIC device 800 has a different reference number for convenience, the dedicated NIC device 800 has the same configuration as the dedicated NIC devices 670 and 770.

This dedicated NIC device has a MAC address.

The dedicated NIC device 800 includes two PCI-Express connectors 840a and 840b, and thus two PCI-Express internal slots (which are also referred to as internal ports) can be connected. Hence, a PCI-Express switch is arranged between the two PCI-Express connectors 840a and 840b, and thus it is possible to transmit and receive data in both directions (see FIG. 6).

However, the dedicated NIC device is characterized in that PCI-Expresses belonging to different systems can be connected. Therefore, in order to transmit and receive data between different systems, a transmission FIFO 820 and a reception FIFO 830 are provided, as shown in FIG. 6. Consequently, transmission data can be retained by the transmission FIFO 820 until the preparation of the computer of the transmission destination is complete, and it is possible to transmit data between the different systems. Likewise, reception data can be retained by the reception FIFP 830 until the preparation of the computer of the reception side is completed and it is possible to receive the data between the different systems. Apart from the fact that the directions are different, the transmission and the reception are the same operations. For convenience, transmission refers to a case where the data is transmitted to the side of the PCI-Express connector 840b and reception refers to a case where the data is transmitted to the side of the PCI-Express connector 840a.

Seventh Section: Virtualization of I/O

Figure 7:
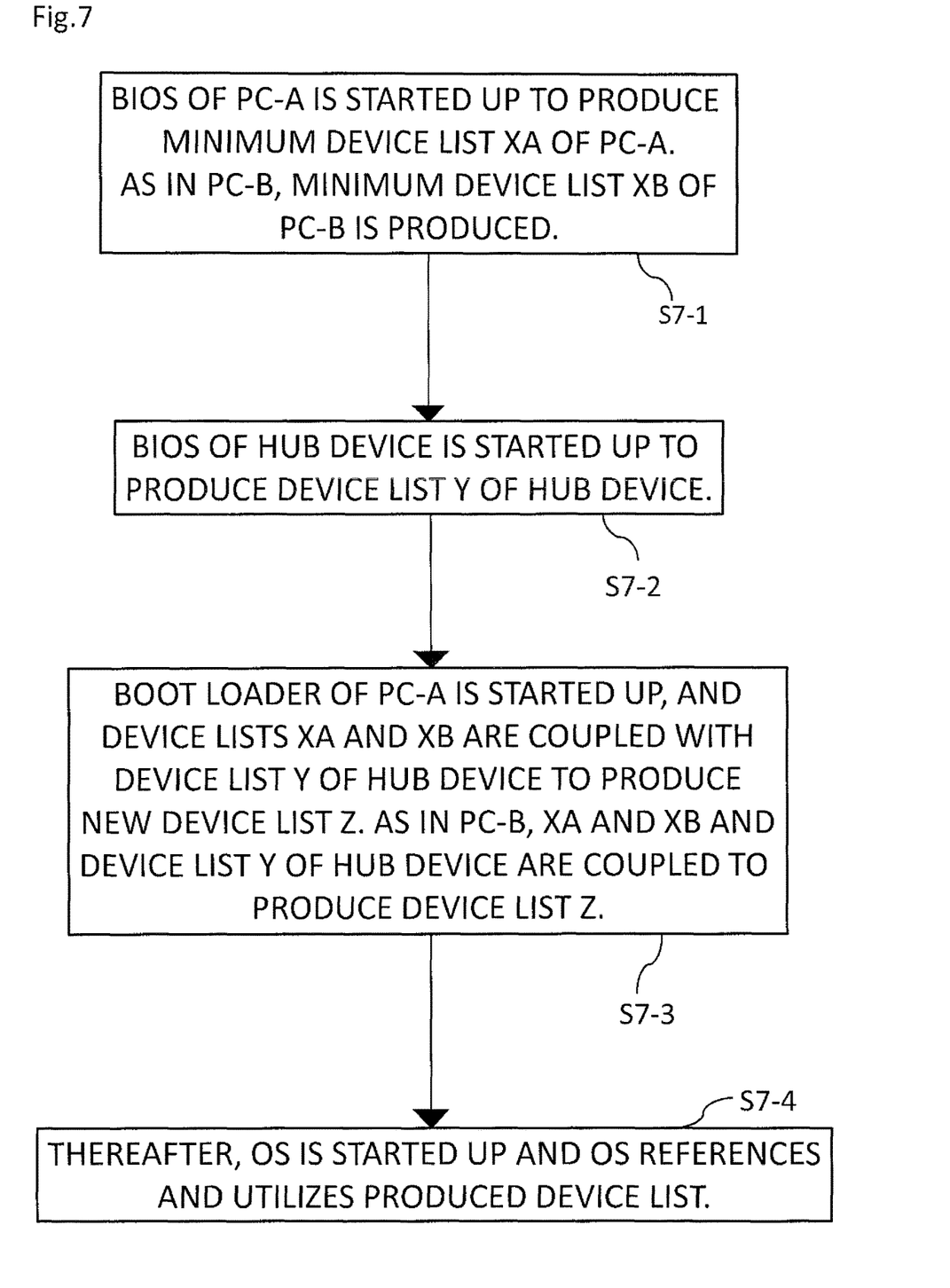
FIG. 7 is a flowchart showing the flow of startup of a system when the virtualization of an I/O is performed.

The present embodiment is characterized in that it is possible to virtualize the I/O by the connection of the HUB device 500 described above. In order to describe a preferred example of such an operation, flow from the startup of the present system to operation/processing will be sequentially described below. A flowchart indicating the flow of the processing is shown in FIG. 7. The flow of a series of these processing steps is processing which is performed so as to virtualize the I/O in the computer system and should be called a method of operating the computer system.

Seventh Section-1: Startup Process (Step 1) (Step S7-1 in FIG. 7)

In the operation of the system shown in FIG. 5, the power supply of the PC group other than the HUB device 500 is first turned on and is started up. In other words, the PC-A600 and the PC-B700 are started up. The PC-C and PC-D (see FIG. 5) are simultaneously started up when they are present.

When starting up the PC-A600 and the PC-B700, a BIOS is started up. The BIOS checks the I/O devices included in the computers, produces a so-called device list and stores it in a hard disk (not shown) or a memory (not shown) therewithin.

In other words, the BIOS of the PC-A600 is started up, and a minimum device list XA of the PC-A is produced. Likewise, for the PC-B700, a minimum device list XB of the PC-B is produced.

Here, minimum generally refers to the inclusion of a VGA, an interface related to a network and a storage such as an HD (hard disk). However, there are cases where a VGA is not needed. With respect to the storage, in recent years, various types of storage other than a hard disk have been widely used. Hence, there is no particular limitation on these, and as long as a device list for the PC can be produced very generally, any device list may be used.

This step 1 corresponds to step S7-1 in. FIG. 7.

(Step 2) (Step S7-2 in FIG. 7)

Next, the power supply of the HUB device 500 is turned on to start up the HUB device 500. The HUB device 500 according to the present embodiment also includes the CPU 510, and is one type of computer. When the HUB device 500 is started up, as in a normal computer, the BIOS is first started up.

When the BIOS is started up, various types of devices in the periphery thereof and various types of I/Os are checked, and necessary initialization/configuration (checking whether or not information can be acquired and used) and the like are performed. Here, the I/O which is connected is checked through the root complex.

Specifically, in a so-called POST (Power ON Self Test), peripheral devices are detected and initialized, and are thus brought into a state in which they can be used. In the POST, hardware resources (such as the I/O address, the memory and an IRQ) required by various types of devices and expansion cards are allocated.

A list of the devices which are detected and allocated is stored as the device list, and the device list is utilized afterward by an OS. The device list is stored in the hard disk (not shown) or the memory (not shown) of the HUB device 500.

In other words, the BIOS of the HUB device 500 is started up, and the device list Y of the HUB device 500 is produced.

*In recent years, "BIOS" has been replaced with firmware called "EFI". If using EH, "BIOS" in the present specification is preferably read as "EFI".

(Step 3) (Step S7-3 in FIG. 7)

Next, the boot loader of the PC-A600 is started up, and the device lists XA and XB and the device list Y of the HUB device 500 are coupled to produce a new device list Z. As in the PC-B700, the device lists XA and XB and the device list Y of the HUB device 500 are coupled to produce a device list Z.

The present embodiment is characterized in that in the device list Z, the I/O device of another PC is included. Therefore, the I/O device of the other PC can be treated as if it were the I/O device of its own PC, and thus it is possible to realize so-called virtualization of the I/O.

The processing and operation described above corresponds to step S7-3 in FIG. 7.

(Step 4) (Step S7-4 in FIG. 7)

After the startup of the OS, the OS and an application started up from the OS utilize the produced device list Y. Consequently, the virtualization of the I/O can be realized.

The processing described above corresponds to step S7-4 in FIG. 7.

In the other PCs (such as the PC-A600 and the PC-B700), information on the I/O device is stored in the memory (see FIG. 4), a hard disk (see FIG. 5), or the like. In this case, the memory or the hard disk corresponds to a preferred example of a storage means in the scope of the claims. Although the information on the I/O device is utilized as the device list, which has been used conventionally, in the present embodiment, it is preferably stored as completely independent other information in the memory or the hard disk.

Seventh Section-2: Address

Although the allocation of the I/O address and the like are performed in step 2 of Seventh section-1 described above, the allocation of the address described above can likewise be performed in the so-called memory. In other words, although the address is called the I/O address here, the address of the memory is the same. Consequently, in general, this address may be called an "I/O memory address".

Seventh Section-3: Provision/Sharing of Device Information and Details of Control (1) As described in Seventh section-1 described above, in the present embodiment, the device list which includes its own I/O device and the I/O device provided in another PC is established. In each of the PCs or the like in the present embodiment, information on the I/O device (mainly, information on an address (which is also referred to as an I/O memory address or an I/O address)) which can be accessed by each PC is acquired based on the device list.

Consequently, each PC can recognize the I/O device which is an I/O device other than that included in its own PC and which can be accessed.

For example, the PC-A600 accesses an I/O device present in another PC through the dedicated NIC device 670 by normal I/O access, and thereby can access it as if it were provided on its own PC (PC-A600). For example, the PC-A600 accesses an HD 760 present on the PC-B700 through the dedicated NIC device 670, and thereby can access it from software as if it were the HD included in its own PC-A600.

(2) When the PC-A600 accesses a predetermined I/O device, access is performed with the address included in the information described above. Then, a request command is transmitted through the dedicated NIC device 670 to the HUB device 500.

Although various methods can be considered in the actual control, it is preferable to determine the destination with an address because, for example, the TLP of the PCI-Express may include various addresses (such as the MAC address) such as the Ethernet frame, as described above. Since the I/O device may include the MAC address, the MAC address is preferably used to determine the destination. Various addresses such as a device ID or information related thereto are preferably used.

As described above, the control of the destination based on the information in the device list established by the BIOS is performed by the switch 530 of the HUB device 500. Consequently, the switch 530 can feed out various commands of the I/O to a predetermined PC.

Seventh Section-4: Operation/Function of OS/Application Level (1) The information in the device list utilized by the OS is preferably distributed to another PC which is newly provided at an OS level, an application level or the like.

In the HUB device 500, based on the device list produced by the BIOS, the device list is produced with reference to the I/O device which can be utilized by each PC.

By such an operation, the I/O device can be treated the same way as a normal I/O device listed in the device list from various types of software which are operated on the PC-A600, for example.

(2) As described above, the control of the destination is performed by the switch 530 of the HUB device 500. The setting of the information on the switch 530 as described above is preferably performed at the OS level, the application level, or the like. Consequently, the switch 530 can feed out various types of commands of the I/O in a predetermined direction (destination).

Seventh Section-5: Target of Virtualization

Furthermore, the HUB device 500 is also one type of PC (personal computer), I/O devices are included therewithin and they are also listed in the device list described above. In other words, since the HUB device 500 (its CPU) can "see" the I/O devices included in all the PCs, the HUB device 500 can recognize them as the I/O devices included in its own PC, with the result that it is possible to list them in the device list.

Hence, the information on the I/O devices which are provided by each PC and which can be accessed include the I/O devices located within the HUB device 500. Consequently, for example, the PC-A600 can access the I/O devices (for example, the HD (hard disk)) within the HUB device 500 as if it were the I/O devices included within the PC-A600.

Eighth Section: Conclusion/Variations

As described above, in the present embodiment, the information on the I/O devices included in the PC which is to be connected is collected, and the device list is produced. Then, based on the information in the device list, the setting of the switch which performs control on the destination and the like is performed. Thus, it is possible to easily realize so-called virtualization of the I/O.

(1) Although in the present embodiment, the PC-A600 and the like couple the device lists produced by the BIOS to produce the device list and thereby realize the virtualization of the I/O (FIG. 7 S7-3), an I/O device information list specific to each application is preferably produced. Since data on existing device lists is not corrected, it is possible to reduce an effect on an application for which virtualization is not particularly needed. Since it is possible to establish the information list for the I/O devices specialized for applications for which virtualization is needed, special design is easily achieved, resulting in that it can be considered easy to enhance performance.

(2) As an example of the control in the embodiment described above, an example where the address in the Ethernet frame of the TLP is utilized is described. Since the I/O device often includes a MAC address, the MAC address is preferably utilized. Various other addresses such as the device ID are also preferably used. Other addresses such as the MAC address are also preferably provided by another method.

(3) Although the "setting of the switch 530" is described in the example described above, since actual information itself is written in the memory, the hard disk or the like, the request command of the I/O or the like is also preferably fed out to an appropriate port by (the switch 530) while referencing information on the memory, hard disk or the like as needed.

A switch which incorporates a so-called setting memory, that is, which is programmable, is also preferably adopted. After predetermined setting information is stored in the memory within the switch, the switch feeds out various types of commands to predetermined ports as necessary based on the setting information.

(4) In the example described above, the PCI-Express, which is one type of internal slot in a computer, is adopted, and an example where a PCI-Express switch (such as 530) is utilized is described.

However, any internal slot that can be utilized by a switch can be utilized.

Although, in terms of actual use, a PCI-Express having a high data transfer speed is used, if an internal slot having a higher speed is developed in the future, such an internal slot can be also preferably used. When attention is not focused on performance, an internal slot having a lower speed can be also preferably used.

Although the term "internal slot" is used here, it may also be referred to as an "internal port" or an "internal bus".

REFERENCE SIGNS LIST

100 TLP main body
102 TLP header
104 data portion (payload)
106 sequence number
108 LCRC
110 data link layer packet
114 start frame
116 end frame
118 physical layer packet
200 Ethernet frame
202 destination address
204 sender address
206 type
208 data portion
210 CRC
300 HUB device
320a, 320b, 320c, 320d, 320e port
330 PCI-Express switch
340 buffer
350 table
400 CPU
410 root complex
420a, 420b, 420c switch
430a, 430b PCI-Express end point
434 endpoint
436 bridge
500 HUB device
510 CPU
520 root complex
530 switch
540a, 540b, 540c, 540d port
600 PC-A
610 CPU
620 root complex
630 switch
640a, 640b, 640c, 640d port
650 GPU
660 HD
670 dedicated NIC device
700 PC-B
710 CPU 720 root complex
730 switch
740a, 740b, 740c, 740d port
750 GPU
760 HD
770 dedicated NIC device
800 dedicated NIC device
840a, 840b PCI-Express connector
820 transmission FIFO
830 reception FIFO
PC-A personal computer A
PC-B personal computer B
PC-C personal computer C
PC-D personal computer D

The invention claimed is:

1. A method of operating a computer system, the method comprising:
   starting up a basic input/output system (BIOS) of a plurality of computers to produce a first I/O device list;
   starting up a BIOS of an I/O virtualizing device to produce a second I/O device list;
   coupling, by the plurality of computers, the first I/O device list and the second I/O device list to produce a third I/O device list; and
   utilizing the third I/O device list by an operating system (OS) of each of the plurality of computers, wherein
   the input/output (I/O) virtualizing device includes a plurality of ports,
   the plurality of computers is connected to the ports, and
   virtualization of I/O communication between the plurality of computers is configured to be performed by the I/O virtualizing device.

2. The method according to claim 1, wherein
each of the plurality of computers includes:
   a dedicated network interface controller (NIC) device which is connected to an internal slot within one of the plurality of computers and which connects the internal slot and at least one of the ports together,
   the I/O virtualizing device includes a switch interface that switches a same signal as a signal of the internal slot, and
   the switch interface inputs and outputs the same signal as the signal of the internal slot through the ports,
each computer of the plurality of computers is configured to access another computer that is different than the respective computer by transmitting the same signal as the signal of the internal slot through the I/O virtualizing device,
the internal slot is a Peripheral Component Interconnect (PCI)-Express slot, and
the switch interface in the I/O virtualizing device:
   takes out a predetermined address from a Transmission Layer Protocol (TLP),
   determines a destination based on the predetermined address, and
   feeds out the input TLP to the port of the destination.

3. The method according to claim 2, wherein
   the switch interface switches a same signal as a signal of the internal slot, and
   the switch interface inputs and outputs the same signal as the signal of the internal slot through the ports.

4. The method according to claim 3, wherein
the dedicated NIC device comprises:
   a first internal slot connector, and
   a second internal slot connector, and
the switch interface:
   connects the first internal slot connector and the second internal slot connector together,
   outputs a signal input from the first internal slot to the second internal slot, and
   outputs a signal input from the second internal slot to the first internal slot.

5. The method according to claim 4, wherein a transmission First-In, First-Out (FIFO), which stores data on the signal when the signal input from the first internal slot, is output to the second internal slot, and a reception FIFO, which stores the signal when the signal input from the second internal slot is output to the first internal slot, are connected to the switch interface.

6. The method according to claim 1, wherein
each of the plurality of computers includes:
   a dedicated network interface controller (NIC) device which is connected to an internal slot within one of the plurality of computers and which connects the internal slot and at least one of the ports together,
   the I/O virtualizing device includes a switch interface that switches a same signal as a signal of the internal slot, and
   the switch interface inputs and outputs the same signal as the signal of the internal slot through the ports,
each computer of the plurality of computers is configured to access another computer that is different than the respective computer by transmitting the same signal as the signal of the internal slot through the I/O virtualizing device,
the internal slot is a Peripheral Component Interconnect (PCI)-Express slot, and
the switch interface:
   takes out a predetermined address from a Transmission Layer Packet (TLP) input from any one of the ports,
   determines a destination based on the predetermined address, and
   feeds out the input TLP to the port of the destination.

* * * * *